United States Patent
Chu et al.

(10) Patent No.: US 11,528,470 B2
(45) Date of Patent: Dec. 13, 2022

(54) DATA TRANSMISSION METHOD, METHOD OF DISPLAYING THREE-DIMENSIONAL IMAGE, DATA TRANSMISSION DEVICE AND THREE-DIMENSIONAL IMAGE DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Minglei Chu, Beijing (CN); Fuqiang Ma, Beijing (CN); Xue Dong, Beijing (CN); Ming Chen, Beijing (CN); Hao Zhang, Beijing (CN); Lili Chen, Beijing (CN); Hongzhen Xue, Beijing (CN); Yaoyu Lv, Beijing (CN); Zhanshan Ma, Beijing (CN); Guixin Yan, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD.

( * ) Notice: Subject to any disclaimer, the term of this patent is extended or adjusted under 35 U.S.C. 154(b) by 213 days.

(21) Appl. No.: 16/834,609

(22) Filed: Mar. 30, 2020

(65) Prior Publication Data
US 2021/0067766 A1    Mar. 4, 2021

(30) Foreign Application Priority Data
Aug. 30, 2019   (CN) .......................... 201910817513.4

(51) Int. Cl.
*G06T 7/90* (2017.01)
*H04N 13/395* (2018.01)
(Continued)

(52) U.S. Cl.
CPC ............ *H04N 13/393* (2018.05); *G02B 30/52* (2020.01); *G06T 7/75* (2017.01); *G06T 7/90* (2017.01); *G06T 15/08* (2013.01); *H04N 13/395* (2018.05)

(58) Field of Classification Search
None
See application file for complete search history.

(56) References Cited

U.S. PATENT DOCUMENTS

2002/0016546 A1* 2/2002 Cerofolini .............. A61B 8/445
                                                              600/443
2013/0187903 A1* 7/2013 Papageorgiou ......... G06T 19/00
                                                              345/419
(Continued)

FOREIGN PATENT DOCUMENTS

CN    101038421 A  *  9/2007
CN    102915563 A     2/2013
(Continued)

OTHER PUBLICATIONS

First Office Action for Chinese Application No. 201910817513.4, dated Sep. 24, 2020, 8 Pages.

*Primary Examiner* — James A Thompson
(74) *Attorney, Agent, or Firm* — Brooks Kushman P.C.

(57) ABSTRACT

A data transmission method, a method of displaying three-dimensional image, a data transmission device and a three-dimensional image display device are provided. The shift register unit includes a device. The data transmission method, comprises: performing a phase decomposition on a preset three-dimensional model to generate a plurality of phase images; acquiring position information and color (Continued)

information of pixels in the plurality of phase images; and sending the position information and the color information of the pixels in the plurality of phase images to a volumetric three-dimensional display device.

16 Claims, 4 Drawing Sheets

(51) Int. Cl.
*G02B 30/52* (2020.01)
*G06T 15/08* (2011.01)
*H04N 13/393* (2018.01)
*G06T 7/73* (2017.01)

(56) References Cited

U.S. PATENT DOCUMENTS

| | | | |
|---|---|---|---|
| 2014/0306952 | A1 | 10/2014 | Oka et al. |
| 2018/0091804 | A1* | 3/2018 | Hunter ................ H04N 13/398 |
| 2019/0164330 | A1* | 5/2019 | Sugano ................ G06T 19/006 |
| 2021/0067766 | A1* | 3/2021 | Chu ........................ G06T 15/08 |
| 2021/0137476 | A1* | 5/2021 | Sano .................... G01N 23/041 |
| 2021/0352323 | A1* | 11/2021 | Sugio ................... H04N 19/167 |

FOREIGN PATENT DOCUMENTS

| | | |
|---|---|---|
| CN | 103918013 A | 7/2014 |
| CN | 104992444 A | 10/2015 |
| CN | 106408664 A | 2/2017 |
| EP | 2346003 A2 | 7/2011 |

\* cited by examiner

DATA TRANSMISSION METHOD, METHOD OF DISPLAYING THREE-DIMENSIONAL IMAGE, DATA TRANSMISSION DEVICE AND THREE-DIMENSIONAL IMAGE DISPLAY DEVICE

CROSS-REFERENCE TO RELATED APPLICATION

This application claims priority to Chinese Patent Application No. 201910817513.4 filed on Aug. 30, 2019, which is incorporated herein by reference in its entirety.

TECHNICAL FIELD

The present disclosure relates to the field of three-dimensional processing technology, and in particular to a data transmission method, a method of displaying three-dimensional image, a data transmission device and a three-dimensional image display device.

BACKGROUND

Among the related three-dimensional display technologies, parallax stereo display technology is currently the most popular stereo display technology. Through specific separation methods, the viewer's left and right eyes can respectively observe the left and right views, and use binocular vision fusion to generate stereo perception.

At present, the biggest difficulty of three-dimensional display in real space is the acquisition, processing, transmission, and reproduction of mass data. In the prior technical solution, the existing display methods include holographic display, volumetric three-dimensional display, and panoramic three-dimensional display based on light field reconstruction.

Volumetric three-dimensional display technology is a technology that uses the spatial scanning of light-emitting points to construct the spatial distribution of pixels, thus producing a three-dimensional display, just like a transparent three-dimensional light-emitting object that emits isotropic light. The volumetric three-dimensional display can be viewed by multiple people, multiple angles and 360° naked eyes at the same time, but due to the isotropy of light emission, it is impossible to reproduce the various space blocking characteristics of the real 3D scene. At present, most of the panoramic 360° three-dimensional display at the technical level are implemented by rotating the screen. However, the traditional data transmission method requires the transmission of multiple entire two-dimensional images, which requires a large amount of data and a slower transmission speed.

SUMMARY

To solve the above problems, a data transmission method is provided in the embodiment of the present disclosure, applied to a terminal, including:
performing a phase decomposition on a preset three-dimensional model to generate a plurality of phase images;
acquiring position information and color information of pixels in the plurality of phase images; and
sending the position information and the color information of the pixels in the plurality of phase images to a volumetric three-dimensional display device.

Optionally, the performing the phase decomposition on the preset three-dimensional model to generate the plurality of phase images further includes:
decomposing the preset three-dimensional model into a preset number of phase planes according to a screen refresh rate of the terminal;
acquiring a tangent between each of the phase planes and the preset three-dimensional model; and
generating the phase image corresponding to each of the phase planes according to the tangent line corresponding to each of the phase planes.

Optionally, the sending the position information and the color information of the pixels in the plurality of phase images to the volumetric three-dimensional display device further includes:
encoding the position information and the color information of each of the phase images to obtain encoded image data corresponding to each of the phase image; and
sending the encoded image data corresponding to each of the phase image to the volumetric three-dimensional display device.

To solve the above problems, a method of displaying three-dimensional image is further provided in the embodiment of the present disclosure, applied to a volumetric three-dimensional display device, including:
receiving image data of a three-dimensional image to be displayed;
acquiring position information and color information of a pixel in the image data; and
generating and displaying a three-dimensional image, according to the position information and the color information of the pixel.

Optionally, the acquiring the position information and the color information of the pixel in the image data further includes:
decoding the image data to obtain decoded image data;
acquiring the position information and the color information of the pixel from the decoded image data.

Optionally, the generating and displaying the three-dimensional image, according to the position information and the color information of the pixel further includes:
generating a phase image according to the position information and the color information of the pixel; and
mapping the phase image to a volumetric three-dimensional display screen to generate and display the three-dimensional image.

To solve the above problems, a data transmission device is further provided in the embodiment of the present disclosure, applied to a terminal, including:
a phase image generation circuit, configured to perform a phase decomposition on a preset three-dimensional model to generate a plurality of phase images;
a first position color acquisition circuit, configured to acquire position information and color information of pixels in the plurality of phase images; and
an image data transmission circuit, configured to send the position information and the color information of the pixels in the plurality of phase images to a volumetric three-dimensional display device.

Optionally, the phase image generation circuit further includes:
a phase plane decomposition sub-circuit, configured to decompose the preset three-dimensional model into a preset number of phase planes according to a screen refresh rate of the terminal;

a tangent acquiring sub-circuit, configured to acquire a tangent between each of the phase planes and the preset three-dimensional model; and a phase image generation sub-circuit, configured to generate the phase image corresponding to each of the phase planes according to the tangent line corresponding to each of the phase planes.

Optionally, the image data transmission circuit further includes:

an encoded data acquisition sub-circuit, configured to encode the position information and the color information of each of the phase images to obtain encoded image data corresponding to each of the phase image; and an image data transmission sub-circuit, configured to send the encoded image data corresponding to each of the phase image to the volumetric three-dimensional display device.

To solve the above problems, a three-dimensional image display device is further provided in the embodiment of the present disclosure, configured to display data transmitted by the data transmission device according to claim 7, including:

an image data receiving circuit, configured to receive image data of a three-dimensional image to be displayed;

a second position color acquisition circuit, configured to acquire position information and color information of a pixel in the image data; and a three-dimensional image display circuit, configured to generate and display a three-dimensional image, according to the position information and the color information of the pixel.

Optionally, the second position color acquisition circuit further includes:

a decoding image data acquiring sub-circuit, configured to decode the image data to obtain decoded image data;

a position color information acquisition sub-circuit, configured to acquire the position information and the color information of the pixel from the decoded image data.

Optionally, the three-dimensional image display circuit further includes:

a phase image generation sub-circuit, configured to generate a phase image according to the position information and the color information of the pixel; and a three-dimensional image display sub-circuit, configured to map the phase image to a volumetric three-dimensional display screen to generate and display the three-dimensional image.

To solve the above problems, an electronic device is further provided in the embodiment of the present disclosure, including:

a processor, a memory and a computer program stored in the memory and executable on the processor, where the processor executes the computer program to perform the data transmission method hereinabove and the three-dimensional image display method hereinabove.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate a part of the disclosed embodiments. A person of ordinary skill in the art can obtain other drawings based on the described drawings without any creative efforts.

DETAILED DESCRIPTION

To describe the objective, the technical solutions and the advantages of embodiments of the present disclosure more clearly, the technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person of ordinary skill in the art based on the described embodiments of the present disclosure fall within the scope of the present disclosure.

In the related art, the display data of the preset three-dimensional model is stored and transmitted in the form of an image, and the amount of data is quite large, and the display data is not properly screened, which causes many problems in storage and transmission.

Figure 1:
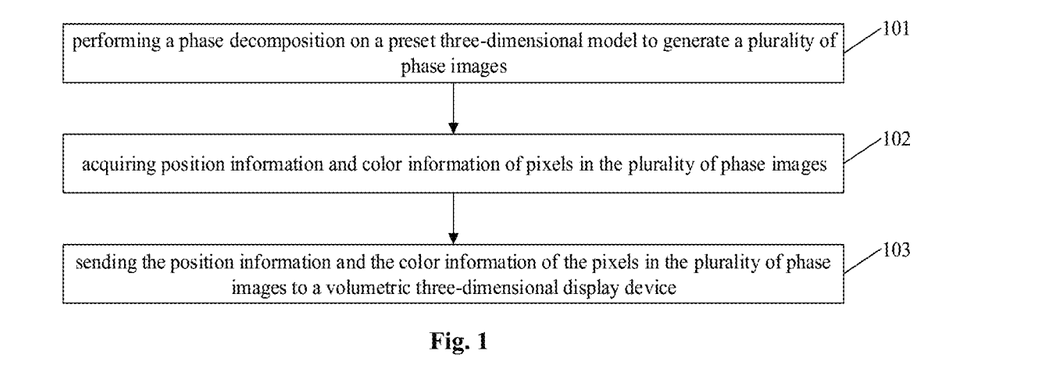
FIG. 1 shows a flowchart of a data transmission method according to an embodiment of the present disclosure.

Referring to FIG. 1, a flowchart of a data transmission method according to an embodiment of the present disclosure is shown. The data transmission method may be applied to a terminal, and may specifically include the following steps:

step 101: performing a phase decomposition on a preset three-dimensional model to generate a plurality of phase images.

In the embodiment of the present disclosure, the terminal may be a personal computer (PC) terminal, such as a desktop computer, a laptop, or the like. The terminal may also be a mobile terminal, such as a mobile phone or Portable Android Device (PAD). Specifically, it may be determined according to actual conditions, which is not limited in the embodiments of the present disclosure.

Of course, in the embodiments of the present disclosure, the terminal may be a PC.

The preset three-dimensional model refers to the model that is set in advance by a business person or user and needs to be displayed in three dimensions. The preset three-dimensional model may be a car model or a home appliance model selected by the business person or the user. Specifically, it may be determined according to actual conditions, which is not limited in the embodiments of the present disclosure.

The phase image refers to the display image generated by each phase plane after the phase decomposition of the preset three-dimensional model. A model processing unit is set in a terminal system. After the preset three-dimensional model is acquired, the preset three-dimensional model can be read into the model processing unit to generate data of an image to be displayed.

After acquiring the preset three-dimensional model, the phase decomposition may be performed on the preset three-dimensional model, so that a corresponding phase image may be acquired. Specifically, the detailed description is described in combination with the following specific implementation manners.

In some embodiments of the present disclosure, the above step 101 may include:

sub-step A1: decomposing the preset three-dimensional model into a preset number of phase planes according to a screen refresh rate of the terminal.

Figure 1A:
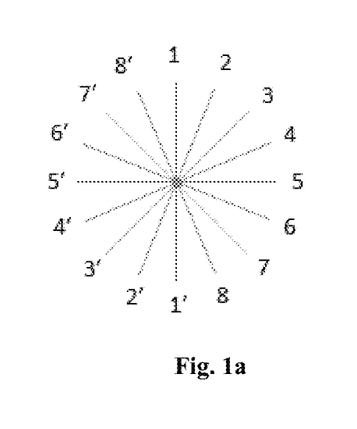
FIG. 1a shows a schematic diagram of a phase plane decomposition according to an embodiment of the present disclosure.

In the embodiment of the present disclosure, the screen refresh rate refers to the refresh rate of the terminal screen. The refresh rate is the number of times the electron beam scans the image on the screen repeatedly. The higher the screen refresh rate, the better the stability of the displayed image (picture) is. The phase plane refers to a plurality of phase planes obtained by segmenting the three-dimensional model according to the screen refresh rate. After acquiring the preset three-dimensional model, the phase decomposition of the preset three-dimensional model may be performed according to the screen refresh rate of the terminal. For example, referring to FIG. 1a, a schematic diagram of a phase plane decomposition according to an embodiment of the present disclosure is shown. As shown in FIG. 1a, a phase decomposition can be performed on the preset three-dimensional model, and eight phase planes can be obtained, such as phase planes 11/, 22/, . . . , 88/.

Figure 1B:
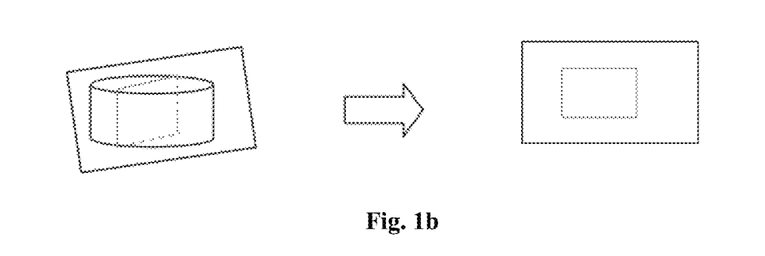
FIG. 1b shows a schematic diagram of a phase plane decomposition according to an embodiment of the present disclosure.

During specific decomposition, as shown in FIG. 1b, referring to FIG. 1b, a schematic diagram of a phase plane decomposition according to the embodiment of the present disclosure is shown. As shown in FIG. 1b, the model can be segmented by a plane. As shown in the right half of FIG. 1b, this smaller rectangular frame is a phase plane.

The preset number is positively related to the screen refresh rate, that is, the preset number can be determined by the screen refresh rate. When performing the phase decomposition on the preset three-dimensional model, the preset three-dimensional model can be decomposed into a preset number of phase planes according to the screen refresh rate of the terminal screen. For example, when the screen refresh rate of the terminal screen is 60 Hz, the phase decomposition can be performed on the preset three-dimensional model to obtain 60 phase planes. When the screen refresh rate of the terminal screen is 120 Hz, the phase decomposition of the preset three-dimensional model can be performed to obtain 120 phase planes.

The more phase planes, the higher the angular resolution and the finer the picture quality. Generally, there are 360 phase planes.

It can be understood that the screen refresh rate is set to be 360 times in 1 s, and because of the visual stagnation of the human eye, the viewer could not discern that the image was refreshed 360 times in 1 s. Utilizing the principle of the human eye's visual stagnation, when the image is refreshed at a high speed, all viewers at different angles can see the entire display image, avoiding the defect that viewers at different angles can only view part of the displayed image.

From another angle, it is understood that the preset three-dimensional model is decomposed into 360 phase images according to phase (or angle), and each phase (or angle) has a phase plane, and each phase image will be rotated 360 degrees within 1 second.

It can be understood that, the foregoing examples are merely examples for better understanding the technical solutions of the embodiments of the present disclosure, and are not intended to be the only limitation on the embodiments of the present disclosure.

After obtaining a preset number of phase planes, sub-step A2 is performed.

Sub-step A2: acquiring a tangent between each of the phase planes and the preset three-dimensional model.

The tangent refers to the tangent formed by the intersection of the phase plane and the outer surface of the preset three-dimensional model. For example, as shown in FIG. 1b, the left half of the figure is a cylindrical model, where the tangent formed by the phase plane tangent to the cylinder model is the rectangular frame shown in the left half.

It can be understood that, the foregoing examples are merely examples for better understanding the technical solutions of the embodiments of the present disclosure, and are not intended to be the only limitation on the embodiments of the present disclosure.

After acquiring the preset number of phase planes, the tangents formed between each phase plane and the preset three-dimensional model can be acquired separately, and sub-step A3 is performed.

Sub-step A3: generating the phase image corresponding to each of the phase planes according to the tangent line corresponding to each of the phase planes. After acquiring the tangents formed by each phase plane and the outer surface of the preset three-dimensional model, a corresponding phase image can be acquired according to the tangent corresponding to each phase plane, as shown in FIG. 1b. The edge line of the small rectangular box in the large rectangular box shown in FIG. 1b is the tangent formed by a phase plane and the outer surface of the preset three-dimensional model, and the rectangular box is the phase image.

After decomposing the preset three-dimensional model to generate a phase image, step 102 is performed.

Step 102: acquiring position information and color information of pixels in the plurality of phase images.

The position information refers to the coordinates of the pixels in the phase image.

The color information refers to the color of each pixel, such as red, green, and blue.

Figure 1C:
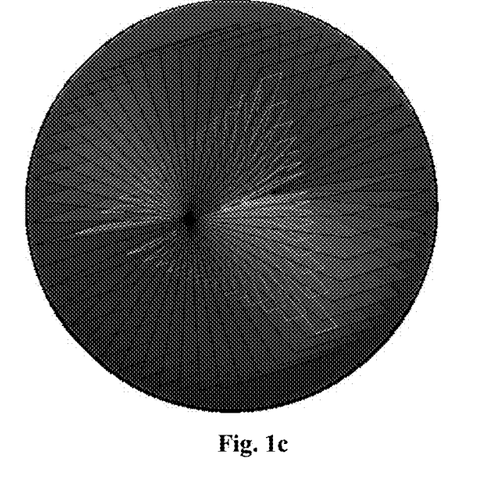
FIG. 1c shows a schematic diagram of phase plane image data according to an embodiment of the present disclosure.

Referring to FIG. 1c, a schematic diagram of phase plane image data according to an embodiment of the present disclosure is shown. As shown in FIG. 1c, after performing the phase decomposition on the preset three-dimensional model, a plurality of phase planes can be acquired. The position information and color information of each pixel in the phase image constitute the image data.

Figure 1D:
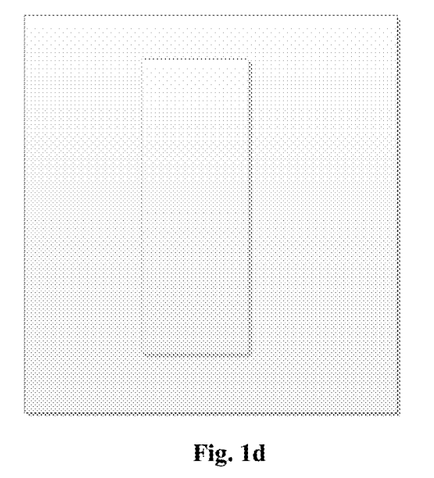
FIG. 1d shows a schematic diagram of phase plane image data according to an embodiment of the present disclosure.

Referring to FIG. 1d, a schematic diagram of phase plane image data according to an embodiment of the present disclosure is shown. As shown in FIG. 1d, each edge of a small rectangular frame constitutes a phase image.

It can be understood that, the above examples are merely examples for better understanding the technical solutions of the embodiments of the present disclosure. In practical applications, it is not limited to the lines of the rectangular frame, but also other shapes, such as circles, rhombuses, or irregular patterns and the like. Specifically, it can be determined according to the actual conditions.

After acquiring the position information and color information of the pixels in the phase image, step 103 is performed.

Step 103: sending the position information and the color information of the pixels in the plurality of phase images to a volumetric three-dimensional display device.

Volumetric three-dimensional stereo display is a stereo display technology. Based on this display technology, you can directly observe three-dimensional images with physical depth of field. The display technology has many advantages, such as realistic images, full-view, multi-angle, simultaneous observation and real-time interaction by multiple people.

The volumetric three-dimensional display device refers to a device that can implement the volumetric three-dimensional display technology. The volumetric three-dimensional display device has a volumetric three-dimensional display screen.

The image information refers to information such as a display size, a resolution, and a display background of a three-dimensional image to be displayed.

After acquiring the position information and color information of the pixels in the multiple phase images, the position information and color information of the pixels in the multiple phase images can be sent to the volumetric three-dimensional display device. Furthermore, the volumetric three-dimensional display device renders and displays the position information and color information of the pixels of the multiple phase images on the volumetric three-dimensional display screen, thereby realizing the display of the three-dimensional image. For the foregoing specific sending process, reference may be made to the detailed description of the following specific implementation manner.

In some embodiments of the present disclosure, the above step 103 may include:

sub-step B1: encoding the position information and the color information of each of the phase images to obtain encoded image data corresponding to each of the phase image.

In the embodiment of the present disclosure, the encoded image data refers to image data of each pixel acquired by encoding the position information and color information of each pixel.

A data encoding unit is also set in the system in advance. After acquiring the position information and color information of each pixel in the phase image, the data encoding unit can encode the position information and color information of each pixel, so that the encoded image data corresponding to each pixel can be acquired.

After acquiring the encoded image data of each pixel in the phase image, sub-step B2 is performed.

Sub-step B2: sending the encoded image data corresponding to each of the phase image to the volumetric three-dimensional display device.

A data transmission unit is also set in the terminal system in advance. After acquiring the encoded image data of each pixel, the data transmission unit can send the encoded image data to the volumetric three-dimensional display device.

In the embodiment of the present disclosure, only the positions and colors of the pixels in the image are transmitted, which can greatly reduce the amount of data to be transmitted.

The embodiments of the present disclosure replace the original transmission of the entire image by transmitting pixel positions and colors, which can greatly reduce the amount of data transmitted and increase the transmission speed.

Figure 2:
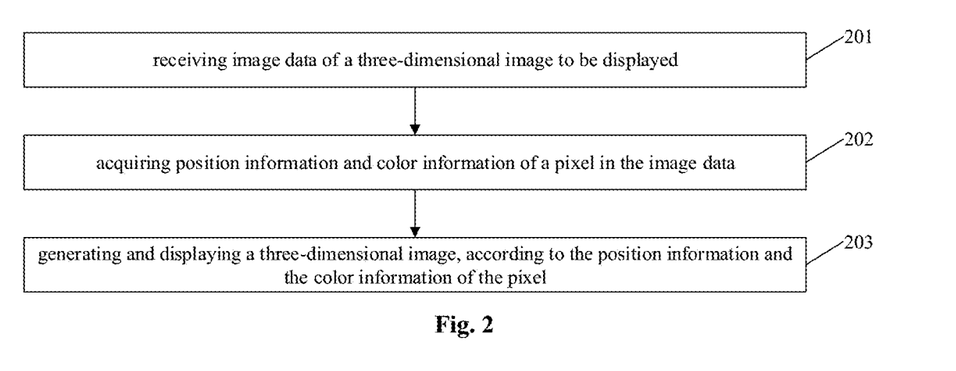
FIG. 2 shows a flowchart of a three-dimensional image display method according to an embodiment of the present disclosure.
Figure 2A:
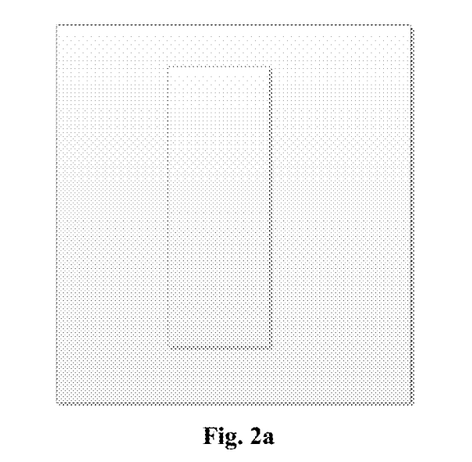
FIG. 2a shows a schematic diagram of drawing a phase image according to an embodiment of the present disclosure.
Figure 2B:
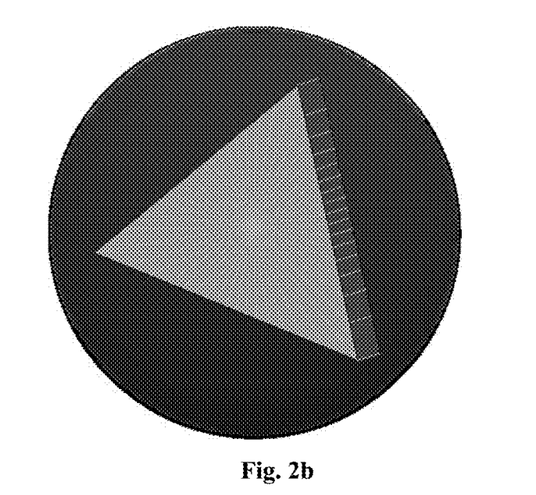
FIG. 2b shows a schematic diagram of a three-dimensional image according to an embodiment of the present disclosure.

Referring to FIG. 2, a flowchart of a three-dimensional image display method according to an embodiment of the present disclosure is shown. The three-dimensional image display method can be applied to a three-dimensional display device, and specifically includes the following steps:

step 201: receiving image data of a three-dimensional image to be displayed.

In the embodiment of the present disclosure, the volumetric three-dimensional display device refers to a device that can implement the volumetric three-dimensional display technology, and the volumetric three-dimensional display device has a volumetric three-dimensional display screen.

Volumetric three-dimensional stereo display is a stereo display technology. Based on this display technology, you can directly observe three-dimensional images with physical depth of field. The display technology has many advantages, such as realistic images, full-view, multi-angle, simultaneous observation and real-time interaction by multiple people.

The three-dimensional image to be displayed refers to a three-dimensional image that requires three-dimensional image display.

The image data refers to data of an image that needs to be displayed in three dimensions. The image data may include the position information and color information of each pixel.

It should be noted that the three-dimensional image display method of the present disclosure receives image information in addition to image data, and the image information refers to information such as a display size, a resolution, and a display background of a three-dimensional image to be displayed.

The image information and image data of the three-dimensional image to be displayed are sent by the terminal. The terminal sends only the image information and image data of the three-dimensional image to be displayed, which can reduce the amount of data sent by the terminal and increase the transmission speed. The volumetric receiving speed of the three-dimensional display device is relatively fast.

After receiving the image information and image data of the three-dimensional image to be displayed, step 202 is performed.

Step 202: acquiring position information and color information of a pixel in the image data.

The position information refers to the position of the pixel in the three-dimensional image to be displayed, such as image coordinates.

The color information refers to the color of each pixel, such as blue and red.

The image data include the position information and color information of a plurality of pixels in a three-dimensional image to be displayed.

After receiving the image data of the three-dimensional image to be displayed sent by the terminal, the position information and color information of the multiple pixels contained in the image data in the three-dimensional image to be displayed can be extracted. The image data is encoded in advance before the terminal sends it, and after the volumetric three-dimensional display device receives the image data, decode the image data, and specifically, it is described in the following specific implementation manners.

In some embodiments of the present disclosure, the above step 203 may include:

sub-step C1: decoding the image data to obtain decoded image data.

In the embodiment of the present disclosure, the decoded image data refers to the image data obtained after decoding the image data.

A data decoding unit is provided in the volumetric three-dimensional display device in advance. After receiving the image data of the three-dimensional image to be displayed, the data decoding unit may perform a decoding operation on the image data, thereby obtaining decoded image data.

After performing a decoding operation on the image data to obtain decoded image data, a sub-step C2 is performed.

Sub-step C2: acquiring the position information and the color information of the pixel from the decoded image data.

After acquiring the decoded image data, the position information and color information of the multiple pixels can be extracted from the decoded image data.

After acquiring the position information and color information of a plurality of pixels in the image data, step 203 is performed.

Step 203: generating and displaying a three-dimensional image, according to the position information and the color information of the pixel.

After obtaining the position information and color information of each pixel of each pixel, a three-dimensional image can be generated according to the position information and color information of each pixel, and the three-dimensional image can be displayed. The user can view the three-dimensional image, and it is specifically described in the following specific implementation manner.

In some embodiments of the present disclosure, the above step 203 may include:

sub-step D1: generating a phase image according to the position information and the color information of the pixel.

In the embodiment of the present disclosure, a phase image refers to an image formed by drawing together the position information and color information of the multiple pixels.

After obtaining the position information and color information of the pixels, a phase image can be generated according to the color information and position information, and a plurality of phase images constitute a three-dimensional image.

After generating a phase image based on the position information and color information of each pixel, sub-step D2 is performed.

Sub-step D2: mapping the phase image to a volumetric three-dimensional display screen to generate and display the three-dimensional image.

After obtaining the phase image, the phase image can be mapped to a volumetric three-dimensional display screen, so that a three-dimensional image can be generated and displayed.

According to the embodiments of the present disclosure the amount of data received by only receiving the pixel position and color sent by the terminal is reduced, without receiving the entire image.

According to the three-dimensional image display method provided by the embodiment of the present disclosure, by receiving image information and image data of a three-dimensional image to be displayed. According to the image information, obtain the position information and color information of the multiple pixels contained in the image data in the three-dimensional image to be displayed. A three-dimensional image is generated and displayed according to the position information and color information of each pixel. The embodiments of the present disclosure reduce the amount of data received by receiving only the position and color of the pixels sent by the terminal without receiving the entire image, and can reduce the amount of image data storage. While improving the reception speed, it can reduce the space occupation of three-dimensional display device.

Figure 3:
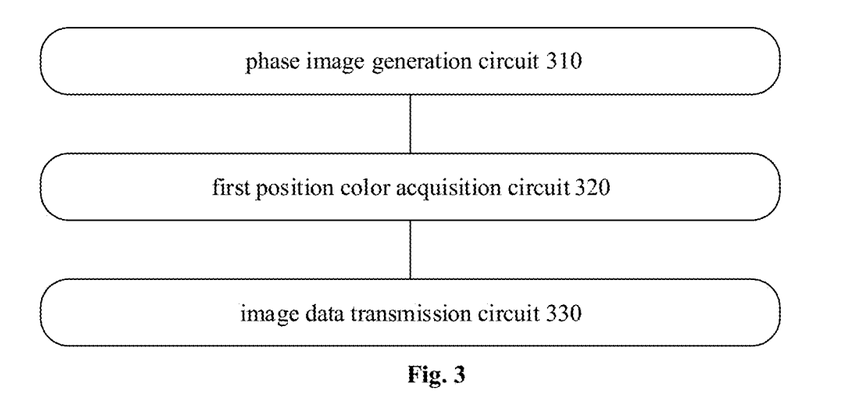
FIG. 3 shows a schematic structural diagram of a data transmission device according to an embodiment of the present disclosure.

Referring to FIG. 3, a schematic structural diagram of a data transmission device according to an embodiment of the present disclosure is shown. The data transmission device may be applied to a terminal, and may specifically include the following circuits:

a phase image generation circuit, configured to perform a phase decomposition on a preset three-dimensional model to generate a plurality of phase images;

a first position color acquisition circuit, configured to acquire position information and color information of pixels in the plurality of phase images; and an image data transmission circuit, configured to send the position information and the color information of the pixels in the plurality of phase images to a volumetric three-dimensional display device.

Optionally, the phase image generation circuit further includes:

a phase plane decomposition sub-circuit, configured to decompose the preset three-dimensional model into a preset number of phase planes according to a screen refresh rate of the terminal;

a tangent acquiring sub-circuit, configured to acquire a tangent between each of the phase planes and the preset three-dimensional model;

a phase image generation sub-circuit, configured to generate the phase image corresponding to each of the phase planes according to the tangent line corresponding to each of the phase planes.

Optionally, the image data transmission circuit further includes:

an encoded data acquisition sub-circuit, configured to encode the position information and the color information of each of the phase images to obtain encoded image data corresponding to each of the phase image;

an image data transmission sub-circuit, configured to send the encoded image data corresponding to each of the phase image to the volumetric three-dimensional display device.

The embodiments of the present disclosure replace the original transmission of the entire image by transmitting pixel positions and colors, which can greatly reduce the amount of data transmitted and increase the transmission speed.

Figure 4:
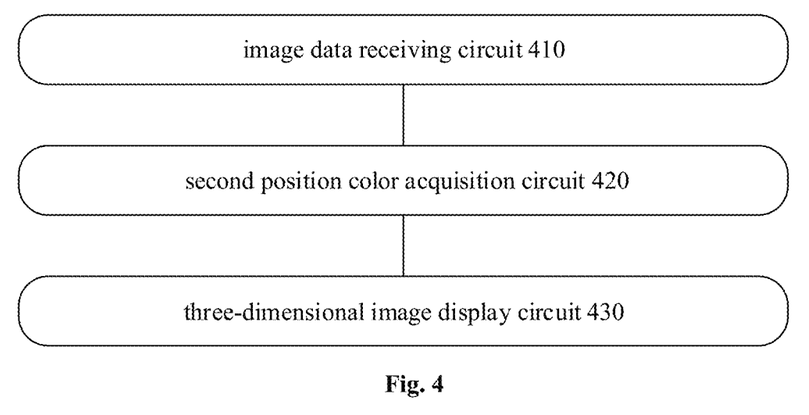
FIG. 4 shows a schematic structural diagram of a three-dimensional image display device according to an embodiment of the present disclosure.

Referring to FIG. 4, a schematic structural diagram of a three-dimensional image display device according to an embodiment of the present disclosure is shown. The three-dimensional image display device may be applied to a three-dimensional display device, and may specifically include the following circuits:

an image data receiving circuit, configured to receive image data of a three-dimensional image to be displayed;

a second position color acquisition circuit, configured to acquire position information and color information of a pixel in the image data;

a three-dimensional image display circuit, configured to generate and display a three-dimensional image, according to the position information and the color information of the pixel.

Optionally, the second position color acquisition circuit further includes:

a decoding image data acquiring sub-circuit, configured to decode the image data to obtain decoded image data;

a position color information acquisition sub-circuit, configured to acquire the position information and the color information of the pixel from the decoded image data.

Optionally, the three-dimensional image display circuit further includes:

a phase image generation sub-circuit, configured to generate a phase image according to the position information and the color information of the pixel;

a three-dimensional image display sub-circuit, configured to map the phase image to a volumetric three-dimensional display screen to generate and display the three-dimensional image.

The three-dimensional image display device according to the embodiment of the present disclosure receives the image information and image data of a three-dimensional image to be displayed, and obtains the position information and color information of the multiple pixels contained in the image data in the three-dimensional image to be displayed according to the image information. A three-dimensional image is generated and displayed according to the position information and color information of each pixel. The embodiments of the present disclosure reduce the amount of data received by receiving only the position and color of the pixels sent by the terminal without receiving the entire image, and can reduce the amount of image data storage. While improving the reception speed, it can reduce the space occupation of three-dimensional display device.

To solve the above problems, an electronic device is further provided in the embodiment of the present disclosure, including:

a processor, a memory and a computer program stored in the memory and executable on the processor, where the processor executes the computer program to perform the data transmission method hereinabove and the three-dimensional image display method hereinabove.

Those skilled in the art should understand that the embodiments of the present disclosure may be provided as a method, a device, or a computer program product. Therefore, the embodiments of the present disclosure may be a form of a full hardware embodiment, a full software embodiment, or an embodiment combining software and hardware. Moreover, the embodiments of the present disclosure may be a form of a computer program product implemented on one or more computer-usable storage media (including but not limited to disk storage, CD-ROM, optical storage, etc.) containing computer-usable program code.

The embodiments of the present disclosure are described with reference to flowcharts and/or block diagrams of the method, the device (system) and the computer program product in the embodiments of the present disclosure. It should be appreciated that each process in the flowcharts and/or each block in the block diagrams, and a combination of a process in the flowcharts and/or a block in the block diagrams may be implemented by computer program instructions. The computer program instructions may be provided to a processor of a general purpose computer, a special purpose computer, an embedded processor, or other programmable data processing device to produce a machine, such that the instructions executed by the processor of the computer or other programmable data processing device produces a device of realizing functions specified in one or more processes in the flowcharts and/or one or more blocks in the block diagrams.

The computer program instructions may also be stored in a computer-readable memory capable of directing a computer or other programmable data processing device to operate in a particular manner, such that the instructions stored in the computer-readable memory produce a manufacture including an instruction device, the instruction device implements functions specified in one or more processes in the flowcharts and/or one or more blocks in the block diagrams.

The computer program instructions may also be loaded onto the computer or other programmable data processing device, so that a series of operating steps may be performed on the computer or other programmable device to produce computer-implemented processing, and thus the instructions executed by the computer or other programmable device provide steps for implementing the functions specified in one or more processes in the flowcharts and/or one or more blocks in the block diagrams.

In a typical configuration, a computing device includes one or more processors (CPUs), an input/output interface, a network interface, and a memory.

The memory may include a non-persistent memory, a random access memory (RAM), and/or a non-volatile memory in a computer-readable medium, such as a read-only memory (ROM) or a flash random access memory (flash RAM). The memory is an example of the computer-readable medium.

The computer readable medium including a persistent medium and a non-persistent medium, a movable medium and a non-movable medium, may store information through any method or technology. The information may be computer-readable instructions, data structures, modules of programs or other data. Examples of the computer storage medium include, but are not limited to, a Phase-change Random Access Memory (PRAM), a Static Random Access Memory (SRAM), a Dynamic Random Access Memory (DRAM), other types of Random Access Memory (RAM), a Read-Only Memory (ROM), an Electrically Erasable Programmable Read-Only Memory (EEPROM), a flash memory or other memory technologies, a Compact Disc Read-Only Memory (CD-ROM), a Digital Versatile Disc (DVD) or other optical storage, a cassette tape, a tape magnetic disk storage or other magnetic storage device or any other non-transmission medium. The computer storage medium may store information that may be accessed by a computing device. According to a definition in the present disclosure, the computer readable medium does not include a transitory medium, such as a modulated data signal and a carrier.

Unless otherwise defined, the technical or scientific terms used in the present disclosure shall have the ordinary meanings understood by those of ordinary skill in the art to which the present disclosure belongs. The terms "first", "second", and the like used in this disclosure do not indicate any order, quantity, or priority, but are only used to distinguish different components. Expressions such as "connection" or "connected" are not limited to denote physical or mechanical connections, but may include electrical connections, whether direct or indirect. "Up", "down", "left", "right", etc. are only used to indicate the relative position relationship. When the absolute position of the described object changes, the relative position relationship changes accordingly.

The above descriptions merely describe optional implementations of the present disclosure. It is appreciated that, modifications and improvements may be made by a person of ordinary skill in the art without departing from the principle of the present disclosure, and these modifications and improvements shall fall within the scope of the present disclosure.

What is claimed is:

1. A data transmission method, applied to a terminal, comprising:

performing a phase decomposition on a preset three-dimensional model that is to be displayed by a volumetric three-dimensional display device to generate a plurality of phase images;

acquiring position information and color information of pixels in the plurality of phase images; and sending image data comprising the position information and the color information of the pixels in the plurality of phase images to the volumetric three-dimensional display device for displaying a three-dimensional image representing the preset three-dimensional model;

wherein the performing the phase decomposition on the preset three-dimensional model to generate the plurality of phase images further comprises:

decomposing the preset three-dimensional model into a preset number of phase planes according to a screen refresh rate of the terminal, wherein the preset number of phase planes are in one-to-one correspondence with the plurality of phase images;

acquiring a tangent line between each of the phase planes and an outer surface of the preset three-dimensional model; and generating a phase image in the plurality of phase images corresponding to each of the phase planes according to the tangent line corresponding to each of the phase planes, wherein the generated phase image comprises only the tangent line;

wherein each of the plurality of phase images is to be mapped to the volumetric three-dimensional display screen that rotates, so that each of the plurality of phase images is rotated a predetermined degree within 1 second.

2. The method according to claim 1, wherein the sending the position information and the color information of the pixels in the plurality of phase images to the volumetric three-dimensional display device further comprises:

encoding the position information and the color information of each of the phase images to obtain encoded image data corresponding to each of the phase image; and sending the encoded image data corresponding to each of the phase image to the volumetric three-dimensional display device.

3. The method according to claim 1, wherein the respective phase plane is included in a preset number of phase planes, and the preset number of phase planes intersect with each other at a same line, the preset number is greater than 3.

4. The method according to claim 1, wherein the respective phase plane is included in a preset number of phase planes, and the preset number of phase planes intersect with each other at a same line, the preset number is greater than 3.

5. The method according to claim 1, wherein the sending the position information and the color information of the pixels in the plurality of phase images to the volumetric three-dimensional display device comprises:

sending position information and the color information of pixels for the tangent line only without sending position information and color information of pixels for regions other than the tangent line.

6. A method of displaying three-dimensional image, applied to a volumetric three-dimensional display device, comprising:

receiving image data of a three-dimensional image representing a preset three-dimensional model to be displayed;

acquiring position information and color information of pixels in the image data, wherein the pixels are from a plurality of phase images which is generated based on the preset three-dimensional model; and generating and displaying the three-dimensional image, according to the position information and the color information of the pixels, wherein the generating and displaying the three-dimensional image, according to the position information and the color information of the pixels further comprises:

generating the plurality of phase images according to the position information and the color information of the pixels, and mapping the plurality of phase images to a volumetric three-dimensional display screen that rotates, so that the plurality of phase images is rotated a predetermined degree within 1 second;

wherein the plurality of phase images each comprises only pixels for a tangent line between a corresponding phase plane and an outer surface of the preset three-dimensional model, the corresponding phase plane is one of a preset number of phase planes generated by decomposing the preset three-dimensional model.

7. The method according to claim 6, wherein the acquiring the position information and the color information of the pixels in the image data further comprises:

decoding the image data to obtain decoded image data;

acquiring the position information and the color information of the pixels from the decoded image data.

8. The method according to claim 6, wherein the receiving image data of the three-dimensional image representing the preset three-dimensional model to be displayed comprises:

receiving position information and the color information of pixels for the tangent line only without receiving position information and color information of pixels for regions other than the tangent line.

9. A data transmission device, applied to a terminal, comprising:

a phase image generation circuit, configured to perform a phase decomposition on a preset three-dimensional model that is to be displayed by a volumetric three-dimensional display device to generate a plurality of phase images;

a first position color acquisition circuit, configured to acquire position information and color information of pixels in the plurality of phase images; and an image data transmission circuit, configured to send image data comprising the position information and the color information of the pixels in the plurality of phase images to the volumetric three-dimensional display device for displaying a three-dimensional image representing the preset three-dimensional model;

wherein the phase image generation circuit further comprises:

a phase plane decomposition sub-circuit, configured to decompose the preset three-dimensional model into a preset number of phase planes according to a screen refresh rate of the terminal, wherein the preset number of phase planes are in one-to-one correspondence with the plurality of phase images;

a tangent acquiring sub-circuit, configured to acquire a tangent between each of the phase planes and the preset three-dimensional model; and a phase image generation sub-circuit, configured to generate the phase image corresponding to each of the phase planes according to the tangent line corresponding to each of the phase planes, wherein the generated phase image comprises only the tangent line;

wherein each of the plurality of phase images is to be mapped to the volumetric three-dimensional display screen that rotates, so that each of the plurality of phase images is rotated a predetermined degree within 1 second.

10. The data transmission device according to claim 9, wherein the image data transmission circuit further comprises:

an encoded data acquisition sub-circuit, configured to encode the position information and the color information of each of the phase images to obtain encoded image data corresponding to each of the phase image; and an image data transmission sub-circuit, configured to send the encoded image data corresponding to each of the phase image to the volumetric three-dimensional display device.

11. The data transmission device according to claim 9, wherein the image data transmission circuit is further configured to:

send position information and the color information of pixels for the tangent line only without sending position information and color information of pixels for regions other than the tangent line.

12. A three-dimensional image display device, configured to display the image data sent by the data transmission device according to claim 9, comprising:

an image data receiving circuit, configured to receive image data of a three-dimensional image representing a preset three-dimensional model to be displayed;

a second position color acquisition circuit, configured to acquire position information and color information of pixels in the image data, wherein the pixels are from a plurality of phase images which is generated based on the preset three-dimensional model; and a three-dimensional image display circuit, configured to generate and display the three-dimensional image, according to the position information and the color information of the pixels;

wherein the three-dimensional image display circuit further comprises:

a phase image generation sub-circuit, configured to generate the plurality of phase images according to the position information and the color information of the pixels; and a three-dimensional image display sub-circuit, configured to map the plurality of phase images to a volumetric three-dimensional display screen that rotates, so that the plurality of phase images is rotated a predetermined degree within 1 second;

wherein the plurality of phase images each comprises only pixels for a tangent line between a corresponding phase plane and an outer surface of the preset three-dimensional model, the corresponding phase plane is one of a preset number of phase planes generated by decomposing the preset three-dimensional model.

13. The three-dimensional image display device according to claim 12, wherein the second position color acquisition circuit further comprises:

a decoding image data acquiring sub-circuit, configured to decode the image data to obtain decoded image data;

a position color information acquisition sub-circuit, configured to acquire the position information and the color information of the pixels from the decoded image data.

14. The three-dimensional image display device according to claim 12, wherein the image data receiving circuit is further configured to:

receive position information and the color information of pixels for the tangent line only without receiving position information and color information of pixels for regions other than the tangent line.

15. An electronic device, comprising:

a processor, a memory and a computer program stored in the memory and executable on the processor, wherein the processor executes the computer program to perform the data transmission method according to claim 1.

16. An electronic device, comprising:

a processor, a memory and a computer program stored in the memory and executable on the processor, wherein the processor executes the computer program to perform the three-dimensional image display method according to claim 6.

* * * * *